United States Patent [19]
Lanham et al.

[11] Patent Number: 5,730,568
[45] Date of Patent: Mar. 24, 1998

[54] ANTI-GALLING FASTENER

[75] Inventors: Thomas R. Lanham; Jeffery R. Sullivan, both of Boston, N.Y.

[73] Assignee: McGard, Inc., Orchard Park, N.Y.

[21] Appl. No.: 726,316

[22] Filed: Oct. 3, 1996

[51] Int. Cl.$^6$ .................................. F16B 37/08; F16B 43/00
[52] U.S. Cl. ........................... 411/432; 411/428; 411/533
[58] Field of Search .................................. 411/427, 428, 411/432, 531, 533, 534

[56] References Cited

U.S. PATENT DOCUMENTS

| | | |
|---|---|---|
| 1,447,564 | 3/1923 | Norlund et al. |
| 4,362,449 | 12/1982 | Hlinsky ................ 411/534 X |
| 4,618,299 | 10/1986 | Bainbridge et al. ......... 411/374 |
| 4,898,429 | 2/1990 | Plumer ................ 411/533 X |
| 4,969,788 | 11/1990 | Goiny ................ 411/428 |
| 4,971,498 | 11/1990 | Goforthe ............. 411/533 X |
| 4,986,712 | 1/1991 | Fultz ................ 411/428 |
| 5,112,176 | 5/1992 | McCauley et al. ...... 411/432 |

*Primary Examiner*—Neill R. Wilson
*Attorney, Agent, or Firm*—Joseph P. Gastel

[57] ABSTRACT

A fastener member in the nature of a nut or bolt which bears against an external member which is softer than the fastener member including a body portion having first and second ends, a spin washer mounted on the first end of the body portion, internal and external surfaces on the spin washer, a first surface on the external surface for bearing the external member with a first frictional force, and a second surface on the internal surface of the spin washer for bearing against the first end of the fastener member with a second frictional force which is less than the first frictional force to thereby permit relative rotation between the first end of the fastener member and the internal surface of the spin washer while the spin washer remains in nonrotatable engagement with the external member.

21 Claims, 2 Drawing Sheets

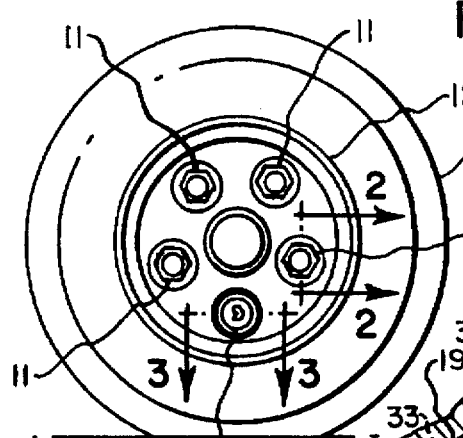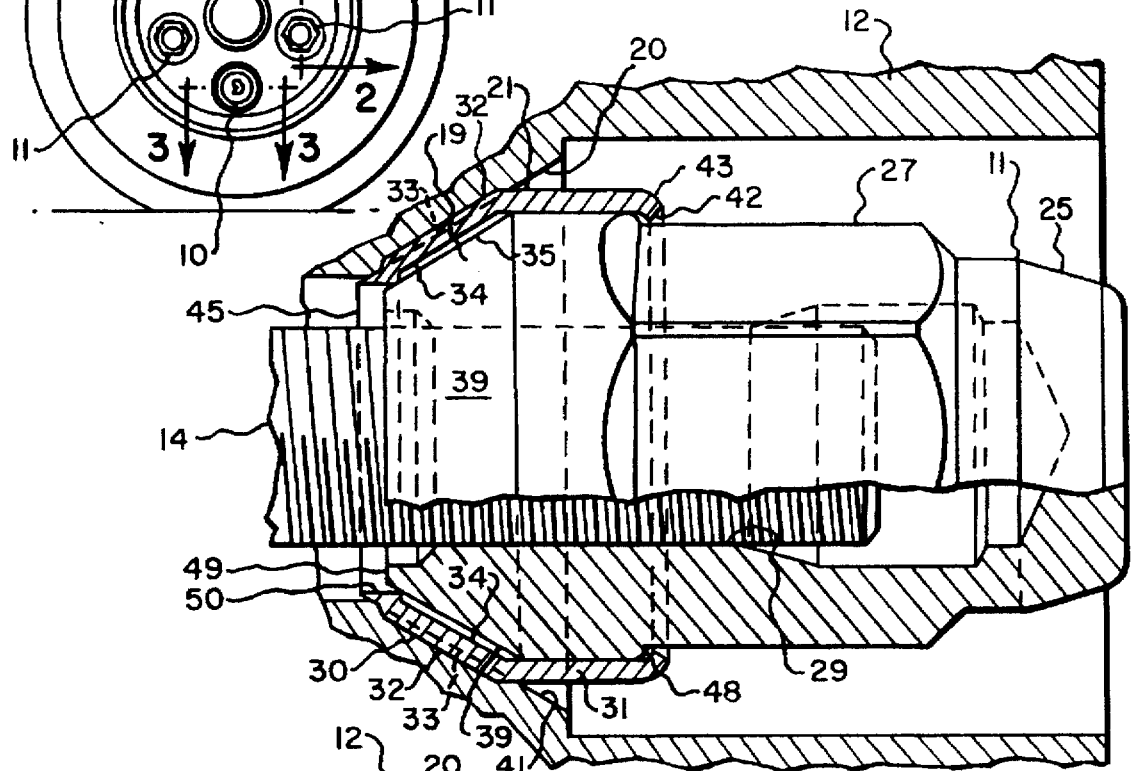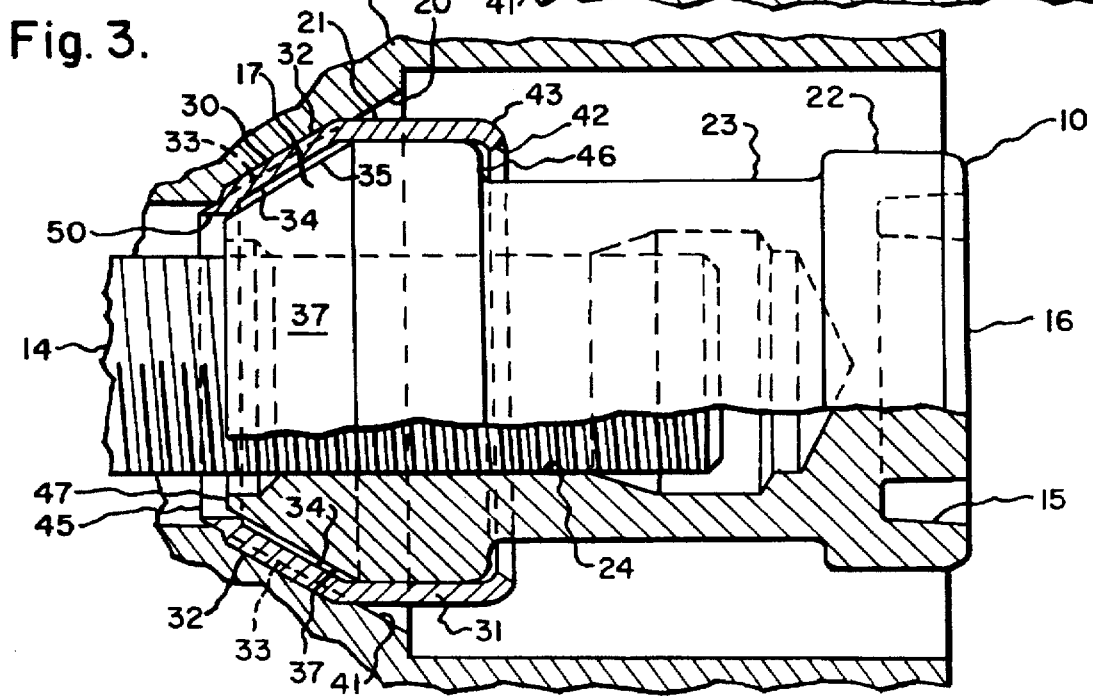

5,730,568

ANTI-GALLING FASTENER

BACKGROUND OF THE INVENTION

The present invention relates to an anti-galling fastener.

By way of background, aluminum alloy rims are now in common use on automobiles. However, when chrome surface nuts or bolts are used in conjunction with the aluminum alloy rims, the rims are subject to galling, that is, the alloy rim becomes worn where the chrome surface rubs against it. In view of this, in certain instances non-decorative fasteners are used which require concealment, and thus the cost of the rim is increased and vehicle styling may be affected. In addition, there is currently in use a nut which has a relatively thick non-chrome spin washer thereon which causes it to be significantly larger than current conventional nuts, which, in turn, requires a specialized rim. Also in the past, in order to use chrome surface nuts with aluminum rims, steel inserts were used in the rims as a buffer between the chrome and the aluminum. This resulted in added cost of the rims. Additionally in the past it was required that the wheel seats on the rim had to be masked from the corrosion-resistant coating placed on the aluminum rims. This also resulted in added cost of the rim. It is with overcoming the foregoing deficiencies of the prior art that the present invention is concerned.

SUMMARY OF THE INVENTION

It is one object of the present invention to provide an improved fastener which will not gall a softer surface, such as an aluminum alloy rim of an automotive vehicle.

Another object of the present invention is to provide an improved fastener which includes a non-rotatable part which contacts a softer surface and also includes a part which is rotated to mount the fastener on an associated member.

Yet another object of the present invention is to provide a spin washer which provides a nonrotatable interface between a softer surface and a portion of fastener which is rotatable relative thereto. Other objects and attendant advantages of the present invention will readily be perceived hereafter.

The present invention relates to a fastener member for bearing against an external member comprising a body portion on said fastener member, first and second ends on said body portion, a spin washer mounted on said first end of said body portion, an external surface on said spin washer, knurling on said external surface, and a smooth internal configuration on said internal surface of said spin washer positioned in substantial complementary relationship to said first end of said body portion.

The present invention also relates to a fastener member for bearing against the side of a depression in an external member comprising a body portion, first and second ends on said body portion with a central body portion therebetween, a spin washer mounted on said first end of said body portion, an internal surface on said spin washer in contiguous relationship to said first end, and an external surface on said spin washer for bearing against said side of said depression, said spin washer being sufficiently thin so that it permits said first end of said body portion to fit against said side of said depression in substantially the same manner with said spin washer mounted thereon as it would without said spin washer mounted thereon.

The present invention also relates to a spin washer comprising a body, a frustoconical portion on said body, a cylindrical portion on said body which is a continuation of said frustoconical portion, external and internal surfaces on said frustoconical portion, knurling on said external surface of said frustoconical portion, and a smooth configuration on said internal surface of said frustoconical surface.

The various aspects of the present invention will be more fully understood when the following portions of the specification are read in conjunction with the accompanying drawings wherein:

BRIEF DESCRIPTION OF THE DRAWINGS

FIG. 1 is a side elevational view of an automotive wheel including a tire mounted on an aluminum alloy rim which is secured to its associated axle with both a plurality of hexagonal nuts of the present invention and a lock nut of the present invention;

FIG. 2 is an enlarged fragmentary cross sectional view taken substantially along line 2—2 of FIG. 1 of the hexagonal nut with its associated spin washer in fully tightened position on the associated aluminum alloy rim with the cross section of the spin washer being taken along line 2—2 of FIG. 4 and line 2—2 of FIG. 7;

FIG. 3 is an enlarged fragmentary cross sectional view taken substantially along line 3—3 of FIG. 1 and showing the locknut with its associated spin washer in fully tightened position on its associated aluminum alloy rim with the cross section of the spin washer being taken along line 2—2 of FIG. 4 and line 2—2 of FIG. 7;

DESCRIPTION OF THE PREFERRED EMBODIMENTS

Figure 4:
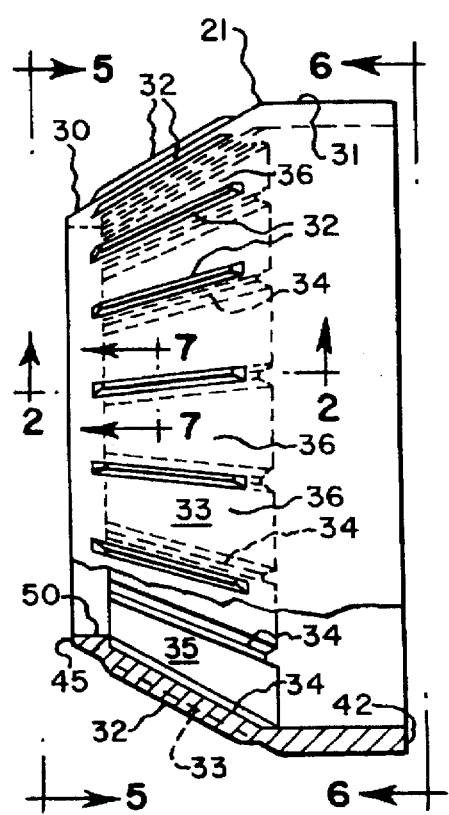
FIG. 4 is a side elevational view of the spin washer before its edge has been rolled to cause it to be permanently mounted at the inner ends of both the hexagonal nut and the locknut.
Figure 5:
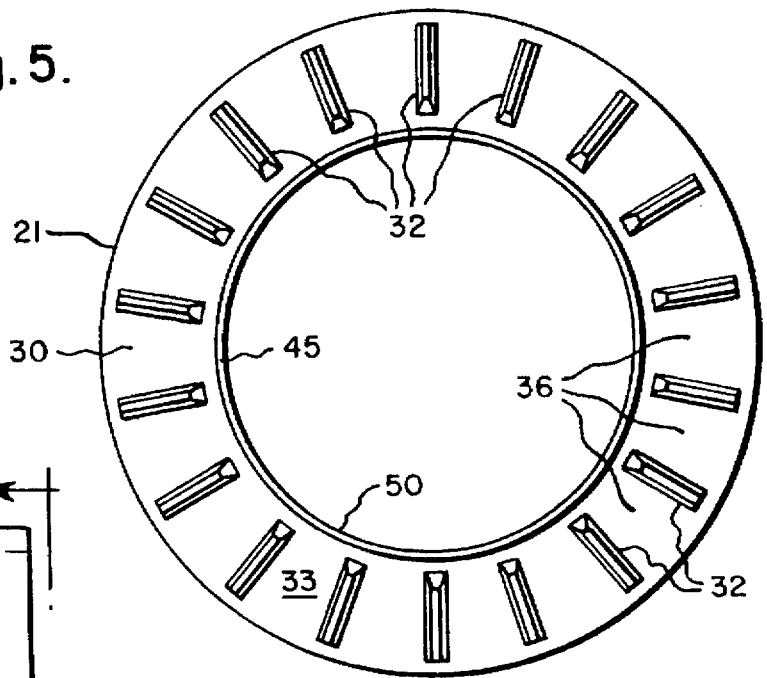
FIG. 5 is a front elevational view taken substantially in the direction of arrows 5—5 of FIG. 4.

In FIG. 1 the improved locknut 10 and the improved conventional hexagonal nut 11 are shown in conjunction with an aluminum alloy automotive wheel rim 12 on which a tire 13 is mounted. The rim 12 is attached to the axle by means of a plurality of hexagonal type lug nuts 11 of the present invention and by the locknut 10 of the present invention, all of which are threaded onto associated studs 14 attached to the vehicle axle. The locknuts 10 can only be turned by a proper mating key which fits into a continuous curvilinear groove 15 in the end 16 of locknut 10, as is well understood in the art.

Summarizing briefly in advance, both the fastener members, namely, the hexagonal nut 11 and the locknut 10 of the present invention are used to mount aluminum alloy rim 12 onto its associated studs 14. The nuts 10 and 11 have body portions which are fabricated of a steel alloy, and they may have a chrome sur#ace. If the inner ends 17 and 19 of nuts 10 and 11, respectively, were to turn against the surfaces 20 of rim 12, galling would occur which would mar the contacted surfaces of the aluminum alloy rim.

In accordance with the present invention, a spin washer 21 is rotatably mounted on the inner ends 17 and 19 of nuts 10 and 11, respectively. Locknut 10 includes an inner end 17, an outer end 22 and a central portion 23 therebetween. Locknut 10 also includes an internally threaded bore 24. As noted above, the outer end 22 of locknut 10 includes a curvilinear groove 15 which receives a mating key (not shown), which is a turning device. Nut 11 includes an inner end 19, an outer end 25 and a central portion 27 therebetween which is of conventional hexagonal configuration for the purpose of receiving a turning device in the form of a wrench. Nut 11 also includes an internal threaded bore 29.

In accordance with the present invention, spin washers 21 are mounted on the inner ends 17 and 19 of nuts 10 and 11, respectively, for the purpose of providing controlled interfaces between the inner ends of the nuts 10 and 11 and the surface 20 of the aluminum alloy rim 12. The spin washer 21 includes a frustoconical end 30 which merges into a cylindrical portion 31. In a preferred embodiment, the spin washer is fabricated from steel which is between 0.032 and 0.038 inches thick and which includes knurling in the nature of a plurality of radial ridges 32 which extend longitudinally on the outer surface 33 of frustoconical portion 30. However, it will be appreciated that the spin washer can have other dimensions. The ridges 32 are formed by a pressing or punching operation which results in depressions 34 on the inner surface 35 of the frustoconical portion 30. The spin washer also includes a smooth internal surface 35, and the depressions 34 do not in any way impair smooth surface contact between the internal surface 35 and external surfaces 37 and 39 of nuts 10 and 11, respectively.

The spin washer 21 has a number of desirable characteristics, namely, (1) the internal surface 35 of the frustoconical portion is of complementary mating form to the external surface 37 of nut 10 and to the external surface 39 of nut 11, and (2) the external surface 33 of frustoconical portion 30 is of complementary mating form to the internal surface 41 of rim 12, and (3) since the spin washer 21 is very thin, it can be mounted on nuts 10 and 11 so that they fit into the depressions 20 in substantially the same manner as the nuts without the spin washers thereon would fit. Furthermore, the height of the ridges 32 above the external surface portions 36 between ridges is very small, in this instance 0.010 inches, which is enough to prevent relative rotation between spin washer 21 and aluminum alloy rim 12 without appreciably penetrating into surface 20 of the rim.

When the spin washers 21 are installed on nuts 10 and 11, the extreme ends 42 of the cylindrical portions 31 are rolled over at 43 around shoulders 46 and 48 of nuts 10 and 11, respectively, so as to permanently retain the spin washers 21 on the nuts 10 and 11.

Preferably the spin washers 21 are coated with a lubricant 44 on their inner surfaces 35. A coating which has been used is a zinc rich organic coating obtainable under the trademark DACROMET 500 which is applied in a dip-spin procedure. This coating is well known in the fastener industry and provides high corrosion resistance as well as lubrication. The spin-dip procedure results in the coating being applied to all surfaces of the spin washer. However, it is only desired that the coating lie on the inner surfaces 35 to provide lubrication between it and the adjacent end of the nut. It is contemplated that the coefficient of friction of the lubricant can be adjusted by the addition of varying amounts of friction increasing material to provide desired torque tension relationships. However, the coating on the external surface 33 will not lubricate the ridges 32 sufficiently to impair their frictional holding force with rim 12.

There are also other coatings which can be applied to the fastener to produce the desired lubrication between the spin washer 21 and the body portion of the nut. In this respect, one such coating is an electroplated zinc with a chromate finish. Also a polytetrafluoroethylene (PTFE) based lubricant or grease can be used.

As noted above, the spin washers 21 are permanently mounted on the nuts 10 an 11. In use, when the nuts are threaded onto studs 14, a point will be reached wherein the ridges 32 press slightly into the softer aluminum alloy rim, as depicted in FIGS. 2 and 3, and thus provide a high frictional resistance and locking relationship between the spin washer 21 and the rim 12. In contrast, the lubrication 44 between the inner ends of nuts 11 and the smooth inner surfaces 35 of spin washers 21 produce low friction so that the nuts 10 and 11 can be turned onto studs 14 while spin washers 21 remain stationary. The foregoing relationship eliminates any galling which could occur on rim 12.

As can be seen from FIGS. 2 and 3, the extreme end portions 45 of spin washers 21 extend outwardly beyond the extreme ends 47 and 49 of nuts 10 and 11, respectively. Furthermore, the inner diameter of opening 50 at the end of spin washer 21 is slightly larger than the inner diameters of internally threaded portions 24 and 29 of nuts 10 and 11. Accordingly, portions 50 of spin washers 21 serve as counter-bores or lead-in portions to guide nuts 10 and 11 onto studs 14.

Figure 8:
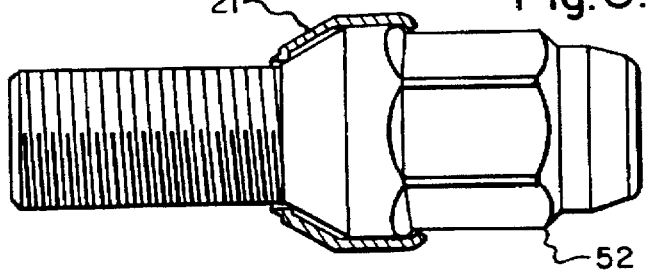
FIG. 8 is a side elevational view of a bolt which mounts a spin washer of the present invention, with the spin washer being shown in cross section.
Figure 7:
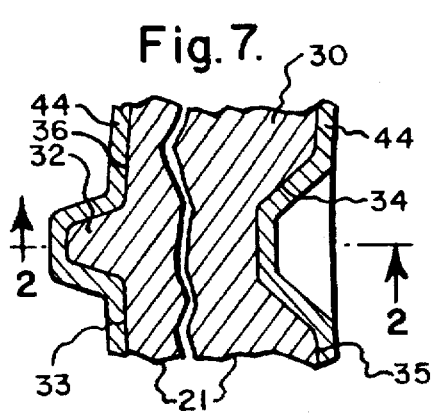
FIG. 7 is a fragmentary cross sectional view of the spin washer taken substantially along line 7—7 of FIG. 4.
Figure 6:
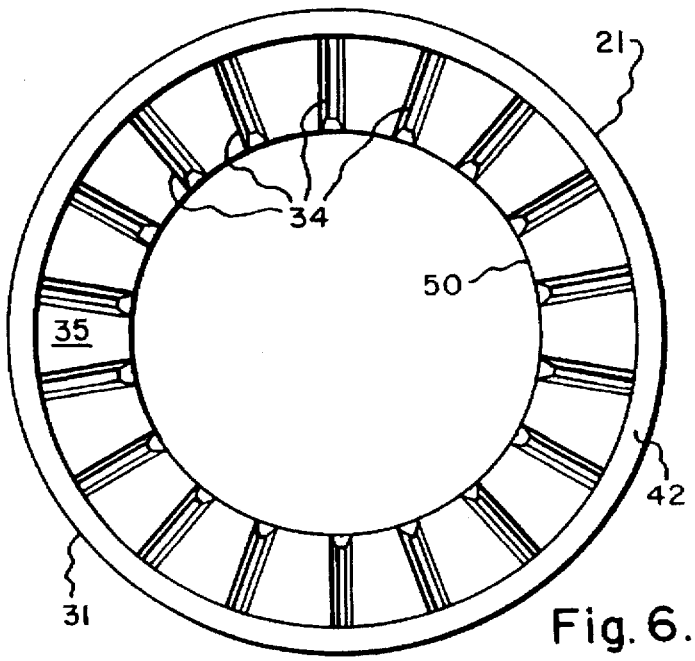
FIG. 6 is a rear elevational view taken substantially in the direction of arrows 6—6 of FIG. 4.

In FIG. 8 there is shown a fastener member in the form of a bolt 52 mounting a spin washer 21 in the same manner as the latter is mounted on nuts 10 and 11.

While the fastener members 10, 11 and 52 have body portions which are of a form for receiving turning devices in the nature of a key or a wrench, it will be appreciated that the term turning device includes tools such as screw drivers and other types of wrenches for use with fastener members which are turned by such tools. Also, while certain dimensions have been set forth above, it will be appreciated that they are by way of example and not of limitation. Additionally, while the knurling has been shown as spaced ridges, it will be appreciated that the knurling comprises protuberances on the outer surface and that knurling of any suitable shape may be employed.

While the described embodiments has shown a spin washer having a frustoconical portion, it will be appreciated that the portion having the knurled surface thereon may be spherical or any other shape which is required to abut a specific seat.

It can thus be seen that the improved fasteners 10, 11 and 52 of the present invention are manifestly capable of achieving the above-enumerated objects, and while preferred embodiments of the present invention have been disclosed, it will be appreciated that it is not limited thereto but may be otherwise embodied within the scope of the following claims.

What is claimed is:

1. A fastener member for bearing against an external member comprising a body portion on said fastener member, said body portion having first and second ends and a central portion therebetween, a spin washer mounted on said first end of said body portion, an internal surface on said spin washer, a knurled external surface on said spin washer for bearing against said external member with a first frictional force, and an internal surface on said spin washer for bearing against said first end of said fastener member with a second frictional force which is less than said first frictional force to thereby tend to obviate relative rotation between said knurled external surface of said spin washer and said external member while permitting relative rotation between said first end of said fastener member and said internal surface of said spin washer, said spin washer being of frustoconical configuration and said knurled external surface comprising a plurality of ridges on said external surface.

2. A fastener member as set forth in claim 1 including a lubricant on said internal surface.

3. A fastener member for bearing against an external member comprising a body portion on said fastener member, said body portion having first and second ends and a central portion therebetween, a spin washer mounted on said first end of said body portion, an internal surface on said spin washer, a knurled external surface on said spin washer for bearing against said external member with a first frictional force, and an internal surface on said spin washer for bearing against said first end of said fastener member with a second frictional force which is less than said first frictional force to thereby tend to obviate relative rotation between said knurled external surface of said spin washer and said external member while permitting relative rotation between said first end of said fastener member and said internal surface of said spin washer, said first end of said body portion having an external configuration and said internal surface of said spin washer being complementary to said external configuration of said first end of said body portion and being sufficiently thin so that it permits said body portion to fit into a receiving recess in substantially the same manner with said spin washer mounted thereon as it would without said spin washer mounted thereon.

4. A fastener member as set forth in claim 3 including a lubricant on said internal surface.

5. A fastener member as set forth in claim 3 wherein said spin washer is of frustoconical configuration and wherein said knurled external surface comprises a plurality of spaced ridges which extend longitudinally on said external surface.

6. A fastener member for bearing against an external member comprising a body portion on said fastener member, said body portion having first and second ends and a central portion therebetween, a spin washer mounted on said first end of said body portion, an internal surface on said spin washer, a knurled external surface on said spin washer for bearing against said external member with a first frictional force, and an internal surface on said spin washer for bearing against said first end of said fastener member with a second frictional force which is less than said first frictional force to thereby tend to obviate relative rotation between said knurled external surface of said spin washer and said external member while permitting relative rotation between said first end of said fastener member and said internal surface of said spin washer, said body portion of said fastener member being a lug nut having a thread with an internal diameter, and said spin washer including a tip portion which extends beyond said first end of said body portion, an opening in said tip portion which is only slightly larger than said internal diameter to thereby function as a lead-in portion for guiding said body portion of said nut onto a stud, said first end of said body portion having an external configuration, said internal surface of said spin washer being complementary to said external configuration of said first end of said body portion and being sufficiently thin so that it permits said body portion to fit into a receiving recess in substantially the same manner with said spin washer mounted thereon as it would without said spin washer mounted thereon.

7. A fastener member as set forth in claim 6 including a lubricant on said internal surface.

8. A fastener member as set forth in claim 7 wherein said knurled external surface comprises a plurality of ridges.

9. A fastener member as set forth in claim 6 wherein said knurled external surface comprises a plurality of ridges.

10. A fastener member for bearing against the side of a depression in an external member comprising a body portion, first and second ends on said body portion with a central body portion therebetween, a spin washer mounted on said first end of said body portion, an internal surface on said spin washer in contiguous relationship to said first end, an external surface on said spin washer for bearing against said side of said depression, said spin washer being sufficiently thin so that it permits said first end of said body portion to fit against said side of said depression in substantially the same manner with said spin washer mounted thereon as it would without said spin washer mounted thereon, and lubricant between said internal surface of said spin washer and said first end of said body portion.

11. A fastener member for bearing against the side of a depression in an external member comprising a body portion, first and second ends on said body portion with a central body portion therebetween, a spin washer mounted on said first end of said body portion, an internal surface on said spin washer in contiguous relationship to said first end, an external surface on said spin washer for bearing against said side of said depression, said spin washer being sufficiently thin so that it permits said first end of said body portion to fit against said side of said depression in substantially the same manner with said spin washer mounted thereon as it would without said spin washer mounted thereon, said first end of said body portion being frustoconical, said spin washer including a first portion which is frustoconical, said internal surface being of substantial complementary configuration to said first end of said body portion, a second portion on said spin washer connected to said first portion, a shoulder on said body portion, and an end portion on said second portion of said spin washer which is bent over said shoulder to retain said spin washer on said body portion.

12. A fastener member as set forth in claim 11 wherein said second portion of said spin washer is substantially cylindrical.

13. A fastener member as set forth in claim 11 including lubricant between said internal surface of said spin washer and said first end of said body portion.

14. A fastener member as set forth in claim 11 wherein said body portion of said fastener member is a lug nut having a thread with an internal diameter, and wherein said spin washer includes a tip portion which extends beyond said first end of said body portion, and an opening in said tip portion which is only slightly larger than said internal diameter to thereby function as a lead-in portion for guiding said nut body onto a stud.

15. A fastener member as set forth in claim 14 wherein said second portion of said spin washer is substantially cylindrical.

16. A fastener member as set forth in claim 11 wherein said body portion of said fastener member is a lug nut having a thread with an internal diameter, and wherein said spin washer includes a tip portion which extends beyond said first end of said body portion, and an opening in said tip portion which is only slightly larger than said internal diameter to thereby function as a lead-in portion for guiding said nut body onto a stud.

17. A spin washer comprising a body, a frustoconical portion on said body, a cylindrical portion on said body which is a continuation of said frustoconical portion, external and internal surfaces on said frustoconical portion, knurling on said external surface of said frustoconical portion, and a substantially smooth configuration on said internal surface of said frustoconical surface.

18. A spin washer as set forth in claim 17 including lubricant on said internal surface of said frustoconical portion.

19. A fastener member for bearing against an external member comprising a body portion on said fastener member, first and second ends on said body portion, a spin washer, an external surface on said first end of said body portion, an internal surface on said spin washer in engagement with said external surface, a thread with an internal diameter in said body portion, a tip portion on said spin washer which extends beyond said first end of said body portion, an opening in said tip portion which is slightly larger than said internal diameter to thereby function as a lead-in portion for guiding said body portion onto a stud, said first end of said body portion being frustoconical, said spin washer including a first portion which is frustoconical, said internal surface being of substantial complementary configuration to said first end of said body portion, a second portion on said spin washer connected to said first portion, a shoulder on said body portion, and an end portion on said second portion of said spin washer which is bent over said shoulder to retain said spin washer on said body portion.

20. A fastener member as set forth in claim 19 wherein said second portion of said spin washer is substantially cylindrical.

21. A fastener member as set forth in claim 19 including knurling on said external surface.

* * * * *